(12) United States Patent
McDermott

(10) Patent No.: US 9,061,287 B1
(45) Date of Patent: Jun. 23, 2015

(54) WOOD CHIPPER, DUMP BOX AND TRAILER

(76) Inventor: James P. McDermott, Worthington, IA (US)

( * ) Notice: Subject to any disclaimer, the term of this patent is extended or adjusted under 35 U.S.C. 154(b) by 405 days.

(21) Appl. No.: 12/367,700

(22) Filed: Feb. 9, 2009

(51) Int. Cl.
*B02C 21/02* (2006.01)

(52) U.S. Cl.
CPC ........................................ *B02C 21/02* (2013.01)

(58) Field of Classification Search
CPC .............................. B02C 21/02; B02C 21/026
USPC ........... 241/92, 101.76; 298/23 D, 23 MD, 18
See application file for complete search history.

(56) References Cited

U.S. PATENT DOCUMENTS

| 2,628,729 | A | * | 2/1953 | Borchers | 414/398 |
| 4,062,498 | A | * | 12/1977 | Szepaniak | 241/101.76 |
| 6,206,477 | B1 | * | 3/2001 | Rexus et al. | 298/23 MD |

* cited by examiner

*Primary Examiner* — Mark Rosenbaum
(74) *Attorney, Agent, or Firm* — McKee, Voorhees & Sease, PLC

(57) ABSTRACT

An improved wood chipper and storage dump box assembly is provided on a trailer adapted to be towed behind a truck. The dump box is pivotally mounted on the trailer for movement between an upright fill position and a sideways tilted dump position. The brush chipper is mounted on a trailer behind the dump box to discharge chipped brush and material into the dump box through an opening in the back wall. The top of the dump box is open for loading logs and other unchipped material. The dump box includes a discharge opening in one side wall, with a door movable between open and closed positions relative to the discharge opening. Hydraulic actuators control movement of the door and tipping of the dump box, and are connected to the hydraulic system of the chipper.

16 Claims, 5 Drawing Sheets

WOOD CHIPPER, DUMP BOX AND TRAILER

BACKGROUND OF THE INVENTION

In the tree pruning and removal industry, it has generally become standard operating procedure to chip the wood and brush debris generated during normal tree pruning or removal operations. The process of chipping limbs reduces bulky branches into a form more suitable to dense packing. The chipping of branches and brush into small chips allows for more material to be stored in a single container, therefore reducing the number of trips an individual must make to a storage or dumping location.

Prior art chippers are predominantly trailerized with axles, wheels and hitches for towing behind a truck equipped with what is commonly termed a "chipper dump box" (often referred to as a "dump box"). Chipper dump boxes are basically large boxes typically made of wood or steel that have been designed to catch and contain wood chips as they are thrown from the exit chute of a trailerized wood chipper towed behind the truck. To unload, gates are opened and the contents of the box are dumped, hence the name "chipper dump box". Chipper dump boxes have some type of roof or tarp covering on the top to prevent the woodchips from blowing out over the top of the chipper dump box because the chips exit the chipper with considerable velocity. The gate or gates of the chipper dump box are to the rear of the box (immediately in front of the towed chipper) and are short enough to allow the chipper to shoot the wood chips over the top of the gate or gates and into the chipper dump box. With this configuration, the truck can be large and the chipper dump box can subsequently be manufactured to have a quite large capacity for chips.

The chipper dump box hinges near the rear of the truck, and after the gates are swung open, the front of the chipper dump box is raised and the chips are dumped out the rear of the chipper dump box. But, before the filled chipper dump box can be dumped, the trailerized chipper must first be unhitched from the truck and left where it sits, or the truck's load of wood chips would be dumped on top of the chipper.

This standard setup adds unnecessary complexity and time to the procedure of dumping the load because not only must the chipper be unhooked from the truck (hereafter called "chipper truck") prior to dumping its load, the chipper must also be backed up to and reconnected (hitch, safety chains, electrical for lights and mandatory "breakaway" brake activator) to the chipper truck before traveling to the next job site. With the basic chipper truck pulling the basic chipper, there is no aerial lift device (with a basket at the end of the boom for an operator to most efficiently access trees) for performance of general tree pruning or removal work.

However, chipper trucks often do include an aerial lift unit (with a basket for an operator at the end of the boom) for a man to work out of so as to be able to most efficiently prune tree branches high above the ground. With an aerial lift included, the chipper dump box must be mounted at the rear of the truck, and the pedestal of the aerial lift unit must be mounted in front of the chipper dump box, immediately behind the cab of the truck (as opposed to the pedestal of the aerial lift being mounted at the rear of the truck). This configuration not only severely limits the size of the chipper dump box, (because the aerial lift's folded boom must rest directly on top of the chipper dump box in a cradle) but the necessary location of the pedestal of the aerial lift device compromises the usefulness of the aerial lift. This is because the forward location of the pedestal (immediately behind the cab) lessens the operator's ability to reach up and out to the rear of the truck, so that not only is overall reach capability generally compromised, (because the pedestal's location in the east-west "middle" of the truck, as opposed to quite close to the end of the truck with a rear mounted pedestal), but that the bulk of tree pruning and removal work has to be done to the vulnerable front and sides of the truck. As more caution must be used (cutting and felling heavy limbs and logs adjacent to the trucks chip dump box and cab), the time required to perform the work increases. With this configuration, when preparing to dump the chipper dump box, (in addition to dropping off the chipper) the operator must first raise the boom of the aerial lift unit before the dump box can be raised. The process having to be repeated in reverse after dumping the load. It should also be noted that weight carrying requirements of such a truck are so large, the bed of the chip box is necessarily quite high off the ground (due to the large frame, wheels, tires, springs and axles under the truck) making it extremely difficult to manually lift and throw logs of any size into the back of the dump box.

The fold position aerial lift above the dump box also must meet height restrictions so that the truck can safely pass beneath bridges, overhead wires, and other structures. Therefore, the height of the dump box must be reduced to accommodate the aerial lift, which reduces the capacity of the dump box.

Aerial lift trucks with chipper dump boxes also have weight considerations. Preferably, the gross weight must be less than 26,000 pounds, so that the driver does not need a commercial driver's license. Based on typical truck and aerial lift weights, the load in the dump box cannot exceed approximately 5,000 pounds, thus further limiting the size and capacity of the box.

Electric utility companies often sub-contract tree services to prune trees clear from their high voltage power lines, but other companies do the work themselves. Generally, when electric utility companies do their own line clearance work, they use their existing fleet of aerial lift units designed for the electric utility industry. These trucks are equipped with "utility bodies" (large cabinets of tool boxes mounted on each side of the truck for the large number of parts and tools required in the industry) and the pedestals of the aerial lift units are mounted at the rear of the truck over the drive axle. As there can physically be no chipper dump box on these trucks, these utility companies must find other means for cleaning up the wood and brush debris generated from the pruning or removal of the trees. This typically means that they must also bring a chipper truck pulling a wood chipper behind it to the job site, thus increasing costs with two vehicles, two drivers, as well as dual registrations, insurance, double the fuel consumption and maintenance.

Another prior art wood chipper, sold by Bandit Industries under the trademark Brush Bandit, is mounted on the front of a trailer, on part of the trailer tongue. This chipper can be rotated toward the passenger side or the driver side. There is a chipper dump box mounted to the rear of the chipper over the axles. The configuration precludes backing up to access multiple piles of brush staged in a line, (such as up a driveway, between houses, between hedges, in an alley, etc.), which is a significant impediment to the brush chipping process. Also, because the Bandit chipper shoots the chips to the rear of the chip box (the box dumps to the rear), the chips immediately pile up high against the gate, meaning that logs or slash cannot be thrown into the chip box after almost any amount of chipping has been done. The Bandit rear gate is not designed to enable rear loading access. Additionally, not only is the size of the chipper negatively limited, due to its location on the tongue, but the box is logically made to match the smaller size of the chipper and there is subsequently no open roof to allow for the craning of large logs into the box.

SUMMARY OF THE INVENTION

In accordance with the preferred embodiment of the invention, the disclosed wood chipper and dump box assembly substantially reduces or eliminates the disadvantages and shortcomings associated with the prior art techniques and apparatus.

The improved wood chipper and dump box assembly of the present invention includes a trailer for towing behind a truck, with a storage dump box mounted on the front of the trailer and a wood chipper mounted on the rear of the trailer. The dump box has a recessed opening in the rear to receive materials from the chipper. The top of the dump box is also open so that logs and other materials may be loaded manually or using an aerial lift. A tarp, net or other covering is provided for the top of the dump box when the chipper is operating.

The dump box is pivotally mounted on the trailer for movement between an upright loading position and a sideways tilted unloading position. The pivot axis is below the trailer bed, and arms extending between the pivot axis and the chipper box move the chipper box and the load laterally away from the trailer bed during dumping. The movement of the dump box is controlled by one or more hydraulic powered hoists. The chipper box door (located on passenger side) is raised (to an open position) and lowered (to a closed position) by two cantilever mechanisms located at each end of the chipper box at the top of the box. The pivot point is in line with the continuous hinge at the top of the door, and the cantilevers are powered with hydraulic cylinders. The dump box cylinders for tilting the dump box and operating the door can be operatively connected to either the hydraulic system of the chipper or to the hydraulic system of the tow vehicle. The location of the dump box hinge below the trailer bed also reduces the inadvertent rolling of logs or other material beneath the trailer. A deck for storing a garden tractor or similar vehicle may be provided on the trailer between the tongue and the dump box, with ramps for moving the tractor on and off the trailer deck.

According to one aspect of the invention, a brush chipper and dump box are mounted in line on a trailer which is hitched to another vehicle.

According to another aspect of the invention, the dump box is pivotably mounted to the trailer so as to tip sideways for unloading, thereby eliminating the need to unhitch and re-hitch a trailerized chipper from a chipper dump truck prior to and after dumping.

According to a further aspect of the invention, the dump box is pivotally mounted, with hinges to a hinge point so as the dump box is tipped it translates away from the trailer, thereby reducing the chance for damage to the trailer.

Still another aspect of the present invention is the provision of a wood chipper and dump box combination which can be pulled to a narrow dump site and unloaded, without having to backup the trailer.

Yet another aspect of the present invention is the provision of an improved wood chipper and chipper box assembly wherein the dump box is pivotally mounted on the trailer, with the pivot access being below the trailer bed so as to prevent logs from rolling underneath the trailer when dumped.

A further aspect of the present invention is the provision of a wood chipper and dump box assembly wherein the dump box moves between an upright loading position and a tilted unloading position spaced laterally apart from the trailer.

Another aspect of the present invention is the provision of a wood chipper and dump box combination having a first actuator for tipping the dump box and to a second actuator for opening and closing the dump box door which may be operatively connected to either the wood chipper or tow vehicle hydraulic system.

A further aspect of the present invention is the provision of a wood chipper and dump box assembly which can be used with a utility truck having a rear mounted aerial lift, and which does not require the aerial lift unit to be raised to dump the chipper box and all attendant disadvantages as previously described.

Still another aspect of the present invention is the provision of a wood chipper and dump box assembly wherein the dump box has a rear opening for receiving chips from the chipper and a top opening for loading logs with an aerial lift or manually from the operator in the aerial lift basket.

Another aspect of the present invention is the provision of an improved wood chipper and dump box assembly for towing by a truck equipped with an aerial lift unit, which eliminates the need for a second truck at the work site.

Still another aspect of the present invention is the provision of an improved wood chipper and dump box assembly which is durable and safe in use, and which minimizes the cost of operation.

These and other aspects of the present invention will become apparent from the following description of the invention.

DETAILED DESCRIPTION OF THE PREFERRED EMBODIMENT

Figure 4:
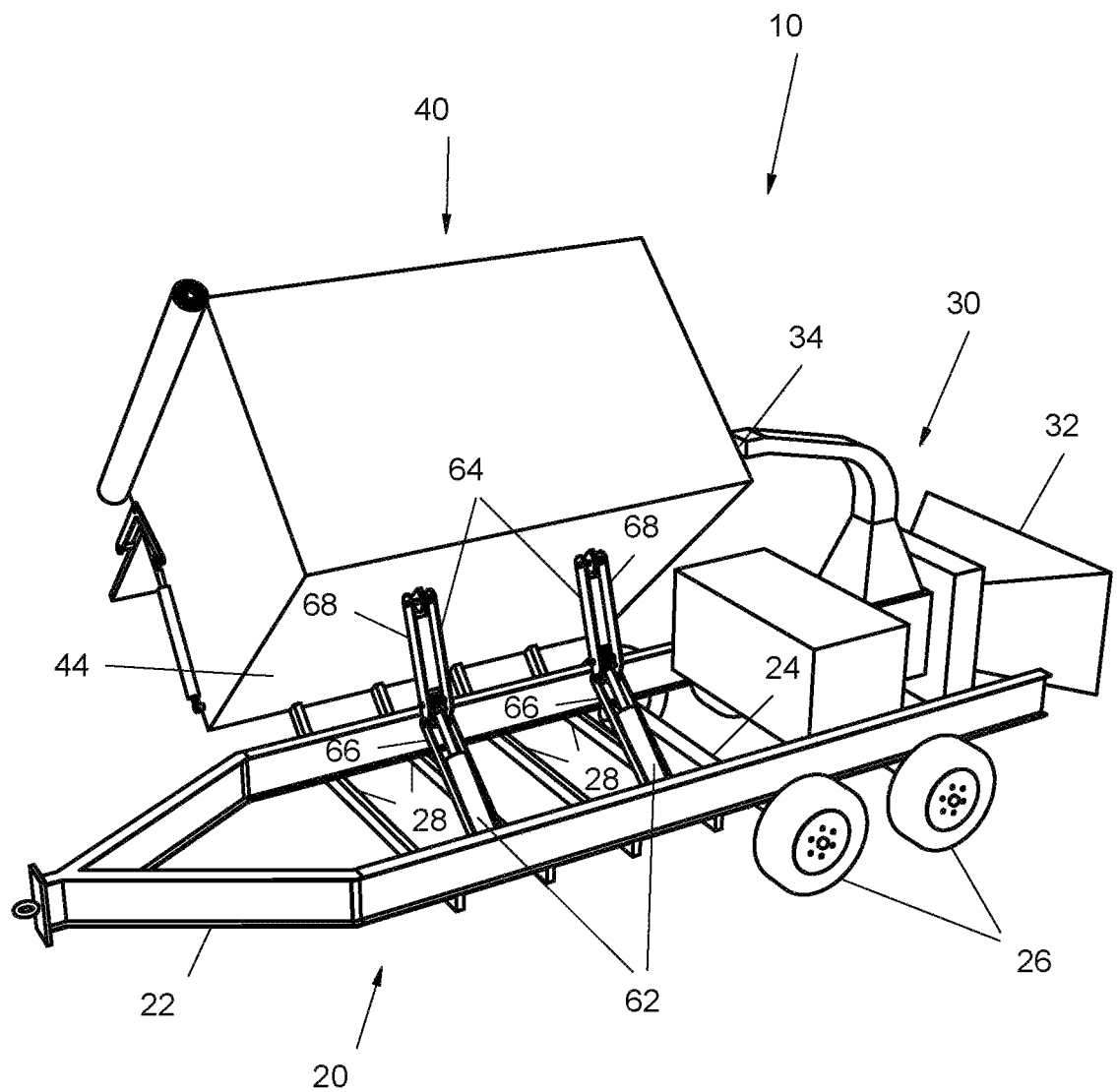
FIG. 4 shows a perspective view substantially from the opposite direction of FIG. 3 showing the underside of the dump box in the unloading position.
Figure 5:
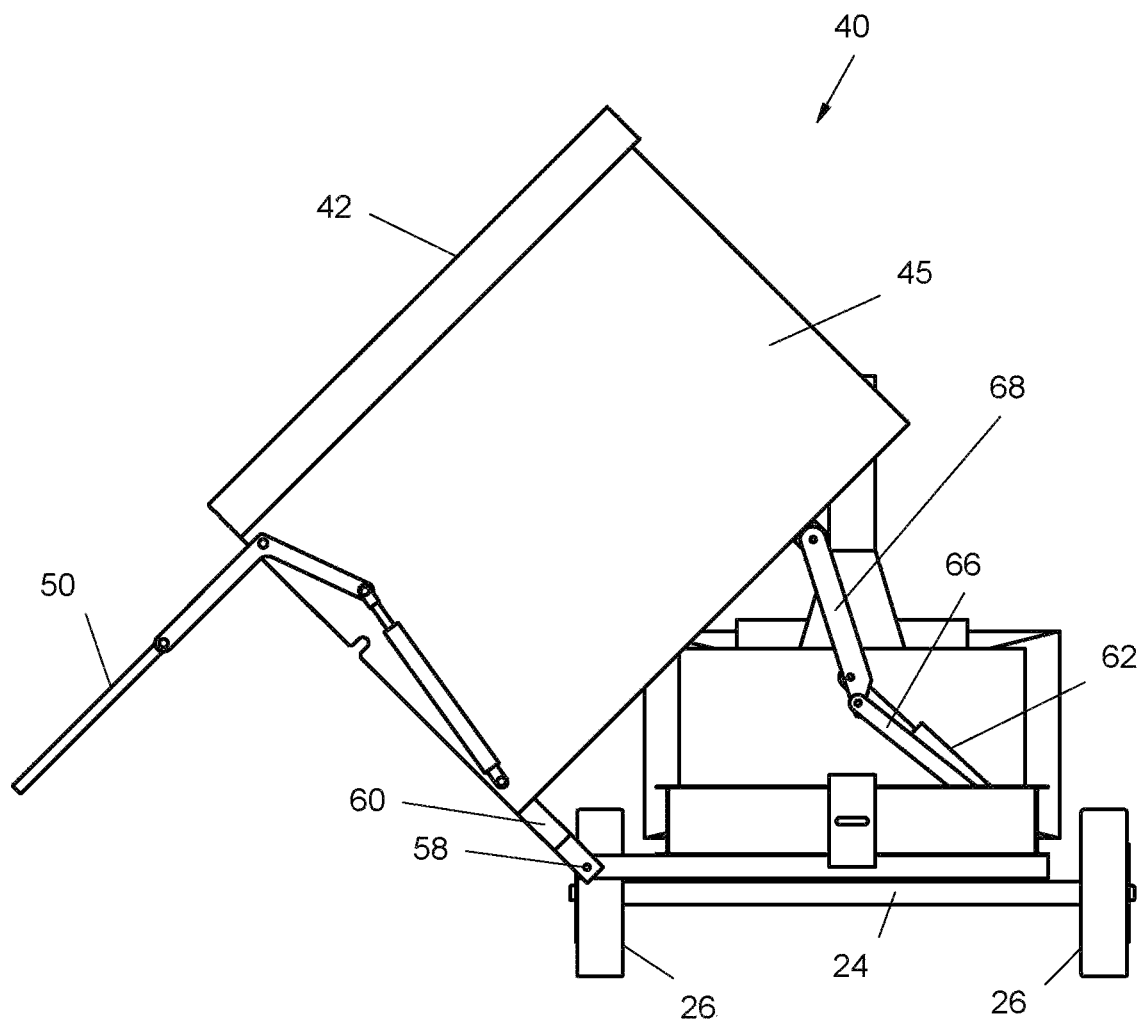
FIG. 5 shows a front view of the assembly with the dump box in the unloading position.

The chipper and dump box assembly 10 of the present invention generally comprises a trailer 20 onto which is mounted a chipper 30 and a dump box 40. The trailer 20 has a frame 22, at least one axle 24, and wheels 26 mounted to the axle 24. The trailer 20 features a number of cross supports 28 (FIG. 4) extending between and beyond the sides of the frame 22.

The chipper 30 has an input end 32 for receiving brush and an output 34 at the end of a chute 36 through which chipped material is discharged into the dump box 40.

Figure 2:
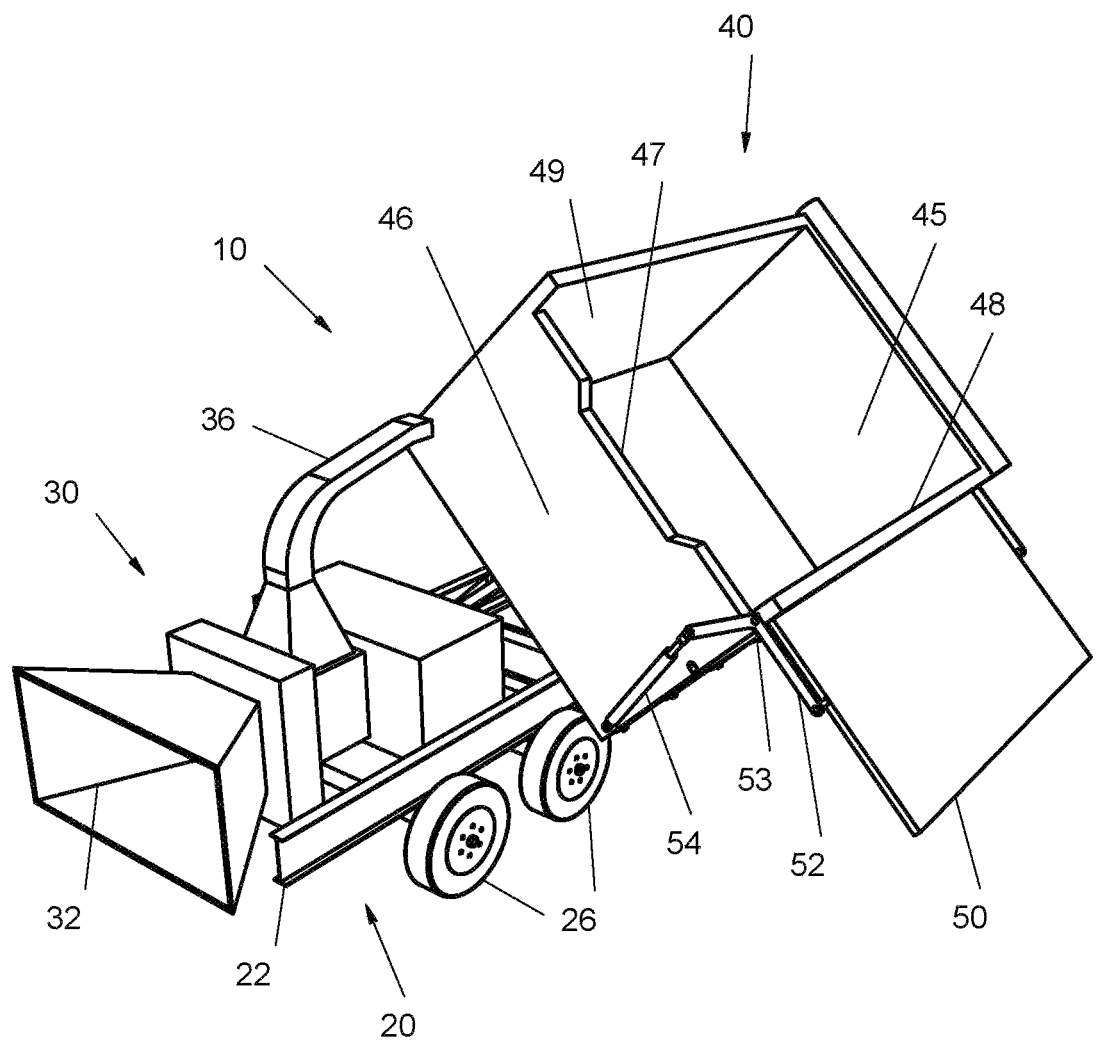
FIG. 2 shows a perspective view from the rear of the assembly showing the dump box in a tilted unloading position.
Figure 3:
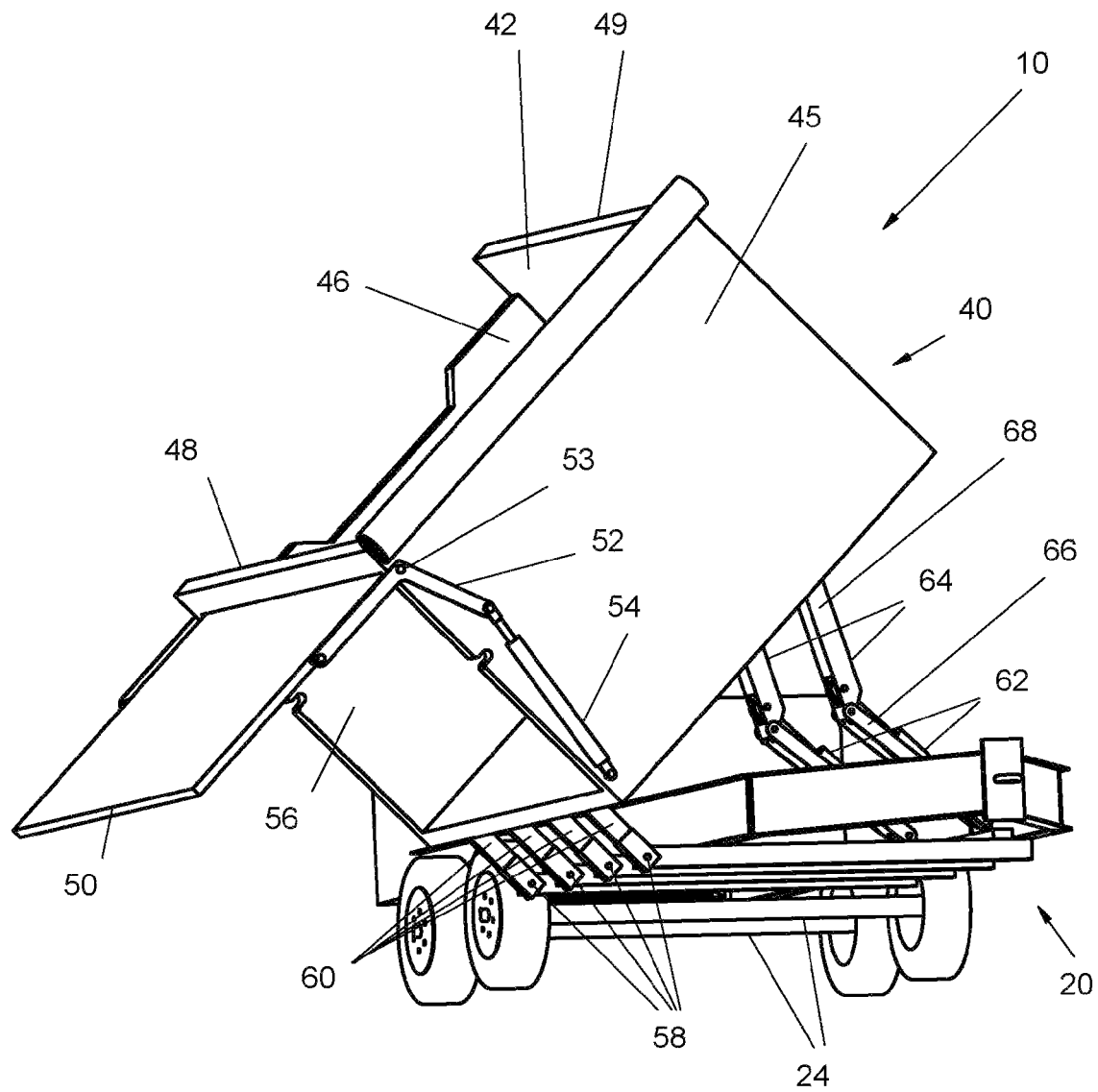
FIG. 3 shows a perspective view of the assembly from the front, showing the dump box in the unloading position.

As best seen in FIG. 2, the dump box 40 includes an open top 42, a bottom 44, a front wall 45, a back wall 46, and opposite sides 48, 49. The side 48 includes an enlarged opening with a door 50 pivotally mounted to the side 48 for movement between open and closed positions relative to the opening. The door 50 is attached to the side 48 in any convenient manner. In the preferred embodiment shown in the drawings, door 50 is pivotally connected to the side wall 48 by a pair of L-shaped pivot arms 52 at the forward and rearward ends of the side 48 and door 50. A pin 53 on each arm 52 extends into the side 48 and the door 50 so as to define a pivot axis. An actuator 54 is provided at each end of the dump box 20 for moving the door 50 between the open and closed positions. Preferably, the actuator 54 is a hydraulic cylinder or piston which is extensible and retractable so as to open and close the door 50. One end of the actuator 54 is fixed to the front and rear walls 45, 46 of the dump box 20, while the opposite end of the actuator 54 is connected to the pivot arm 52, as best seen in FIGS. 2 and 3. When the actuator 54 is extended, the door 50 is closed. When the actuator 54 is retracted, the door 50 is opened.

Figure 1:
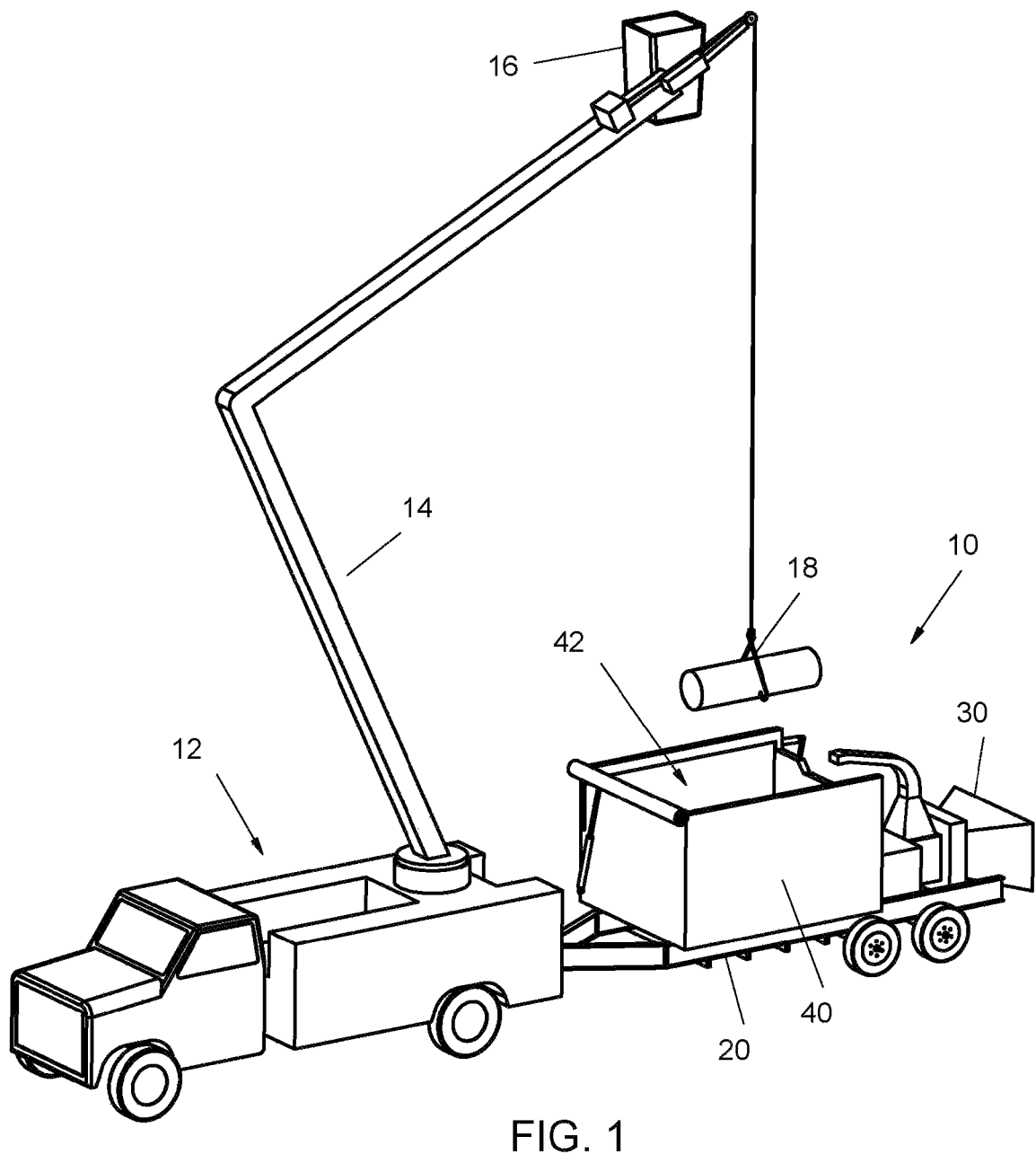
FIG. 1 shows a perspective view of the wood chipper and dump box assembly of the present invention hitched to a utility vehicle having a rear mounted aerial lift, with the dump box in an upright loading position.

The top 42 of the dump box 40 may be covered with a tarp or net, particularly when the chipper 30 is in use and during transportation when the dump box 40 is full. When the tarp or net is removed, other debris may be loaded into the dump box 40 using the truck hoist (as shown in FIG. 1) or may be manually thrown into the dump box through the opening in side 48.

As shown in FIG. 3, the dump box 40 is pivotally attached to the trailer 20 by means of a hinge 58 so that the dump box 40 may be tilted to the side of the trailer 20 for dumping material from the dump box. The hinge pins 58 connect four extensions 60, classified as hinges, extending downwardly from the side 48 of the dump box 40 to the cross supports 28. The dump box 40 is pivoted by means of one or more scissor-type hoist, located beneath the dump box 40. The hoist includes a pair of actuator cylinders 62 connected to guides 64 which ensure proper orientation of the dump box 40 during the dumping process.

Each of the guides includes lower and upper segments or arms 66, 68, which are pivotally connected at their inner ends. The outer ends of arms 66 are connected to the trailer 20, while the outer ends of the arms 68 are connected to the bottom of the dump box 40. When the cylinders 62 are retracted, the arms 66, 68 are folded and the dump box 40 is in the lowered loading or fill position shown in FIG. 1. When the cylinders 62 are extended, the arms 66, 68 unfold and the dump box 40 tilts to the unloading or dumping position shown in FIGS. 2-5. The dump box pivots about the axis or hinge 58 when the cylinders 62 are actuated. When the cylinders 62 move the dump box 40 to the dump position, the extensions 60 cause the opening 56 of the dump box 40 to be moved laterally away from the trailer 20 so that material dumped from the dump box 40 does not discharge or flow beneath the trailer.

A 4" angle iron (not shown) may be mounted underneath the cross supports 28 which prevents large logs dumped from the dump box 40 from rolling underneath the trailer 20. The angle iron preferably does not reduce the clearance of the trailer 20 as it does not extend below the axle 24.

The invention preferably is used in the following manner. Wood and brush is inserted into the chipper 30 through the input port 32 where it is reduced to wood chips and discharged through the chute 36 and into the dump box 40. The top of the dump box 40 is covered with a tarp or net during such chipping. Larger material, such as logs, not suitable to be chipped, are deposited, such as by an attached crane 14 of the truck 12, through the open top 42 of the dump box 40 or by opening door 50 and hand loading. Smaller slash material not suitable for chipping may be loaded into the dump box 40 by hand or scoop shovel. The rear wall 46 of the dump box features a cut out or notch 47 consisting of a lower edge that enables the chips to clear that wall 46. This cut out 47 also makes it easier for an individual to manually load slash material into the dump box 40 by shovel or pitchfork by reducing the height the individual must lift the slash material. Once all material has been collected into the dump box 40, the operator takes the trailer 20 to a dumping site. At the dumping site, the door pistons 54 and dump box cylinders 62 are activated, either by the hydraulic system of the chipper 30, or alternatively, by a hydraulic supply of the towing vehicle 12 to which the trailer 20 is hitched. The door 50 is opened by retracting the pistons 54, and the dump box 40 is tilted to a dumping position by extending the pistons 62. In conjunction with the hinges 60, the guides 64 attached to the bottom 44 of the dump box 40 ensure that the dump box 40 is lifted cleanly to avoid bending of the pistons 62 due to uneven loads in the dump box 40. As the dump box 40 is tilted about the hinges 60, the material falls out of the dump box 40 to the dump location. Large logs which roll out of the dump box 40 are stopped from rolling beneath the trailer 20 by the angle iron mounted under the cross supports 28.

It is important to note that in dumping the material, it is not necessary to unhitch or otherwise remove the chipper 30 from its position behind the dump box 40. Because of this improvement, an individual operating the apparatus 10 does not have to spend time unhitching the chipper 30, moving the truck 12, dumping the material, repositioning the truck 12 adjacent to the chipper 30, and reattaching the chipper 30. Also, the trailer 20 does not have to be backed up at the dump site, but can easily be pulled alongside an unloading location. Also, by placing the chipper inlet 32 at the rear of the trailer 20, the chipper 30 is more easily accessed with brush material or the brush material more easily accessed with the chipper 30 than when the chipper 30 is mounted in front of the dump box 40 as in prior art chipper-dump box combinations. The elimination of these steps in the chipping process therefore improves the efficiency and the amount of work an individual can accomplish in a given day.

A deck may be provided on the trailer 20 in front of the dump box 40 to haul other equipment. For example, a small garden tractor may be carried on the deck for use in hauling logs from a work site that is not close to the truck 12 and trailer 20, such as the backyard of a home. Ramps may be removably attached to the trailer frame 22 to load and unload the tractor. The ramps may be stored in a storage compartment on the trailer 20 when not in use.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved wood chipper and dump box assembly, comprising:
   a trailer adapted to be towed behind a truck;
   a brush chipper mounted on the trailer and fixed against movement relative to the trailer while operating on the trailer;
   a dump box pivotally mounted on the trailer in front of the chipper for movement between an upright fill position and a sideways tilted dump position;
   the dump box having a front wall, a rear wall, and opposite side walls with an opening and a door on one of the side walls;
   the chipper having a rear inlet and a forward outlet for discharging chipped material in the dump box; and
   the trailer having a frame and the dump box being pivotally attached to the trailer at an elevation beneath the frame.

2. The assembly of claim 1 wherein the trailer has a longitudinal axis and the dump box pivots about an axis parallel to the trailer axis.

3. The assembly of claim 1 wherein the trailer has opposite lateral sides and the dump box is pivotally attached to one of the sides.

4. The assembly of claim 1 wherein the dump box has an open top.

5. The assembly of claim 1 wherein the door is hinged adjacent the top of the dump box so as to pivot about a horizontal axis.

6. The assembly of claim 5 further comprising a pair of pistons attached to the dump box door and to the front and rear walls of the dump box for moving the door between open and closed positions.

7. The assembly of claim 1 further comprising at least one piston attached between the dump box and the frame for pivoting the dump box between the upright and tilted positions.

8. A wood chipper and collection dump box combination, comprising:
- a trailer having a front end, a back end, opposite first and second sides, and a pair of wheels attached to an axle between the front and back ends;
- a dump box on the trailer;
- the dump box having front and rear ends and opposite first and second sides;
- a hinge for pivotally mounting the dump box on the trailer, the hinge being below the dump box on the first side thereof, and extending substantially perpendicular to the axle;
- the hinge having a pivot axis spaced apart from and below the dump box and including arms extending upwardly to the dump box so as to extend the dump box laterally outwardly away from the trailer when moved to the unloading position;
- a door on the first side of the dump box;
- a tilt actuator beneath the dump box to pivot the dump box sideways between an upright loading position and a tilted unloading position;
- a wood chipper securely mounted on the trailer behind the dump box; and
- the dump box having an opening in the rear end for receiving material from the chipper and an open top for receiving additional material not passing through the chipper.

9. The combination of claim 8 wherein the tilt actuator is at least one hydraulic cylinder extending between the trailer and the dump box.

10. The combination of claim 8 wherein the trailer includes a bed and the hinge pivot axis resides below the bed.

11. The combination of claim 8 further comprising a door actuator for moving the door between open and closed positions.

12. The combination of claim 11 further comprising a door hinge to pivotally connect the door to the dump box, the hinge having an axis extending longitudinally adjacent a top edge of the door.

13. The combination of claim 8 further comprising a first hydraulic actuator for tilting the dump box and a second hydraulic actuator for moving the door between open and closed positions, and wherein the chipper includes a hydraulic system operatively connected to the first and second hydraulic actuators.

14. The combination of claim 8 wherein the chipper includes an inlet chute extending rearwardly beyond the trailer and a forward outlet for discharging material into the dump box.

15. The combination of claim 8 further comprising a pair of actuators located at the front and rear ends of the dump box and each actuator having a first end attached to one end of the dump box and a second end attached to the door to move the door between opened and closed positions.

16. The combination of claim 8 wherein the chipper is fixed against movement relative to the trailer while operating on the trailer.

\* \* \* \* \*